Figure 2:
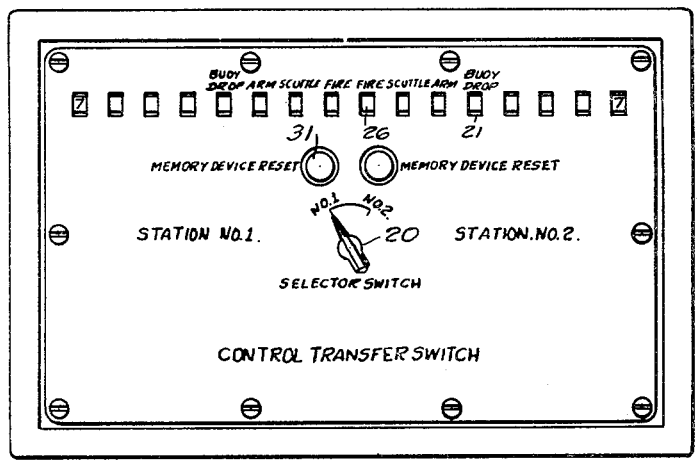

May 8, 1951 W. SCHAELCHLIN ET AL 2,551,972
REMOTE-CONTROL SYSTEM
Filed Nov. 21, 1946 7 Sheets-Sheet 1

INVENTORS
Walter Schaelchlin,
Amos J. Winchester, Jr.,
and John C. Ponstingl.
BY
Paul E. Friedemann
ATTORNEY

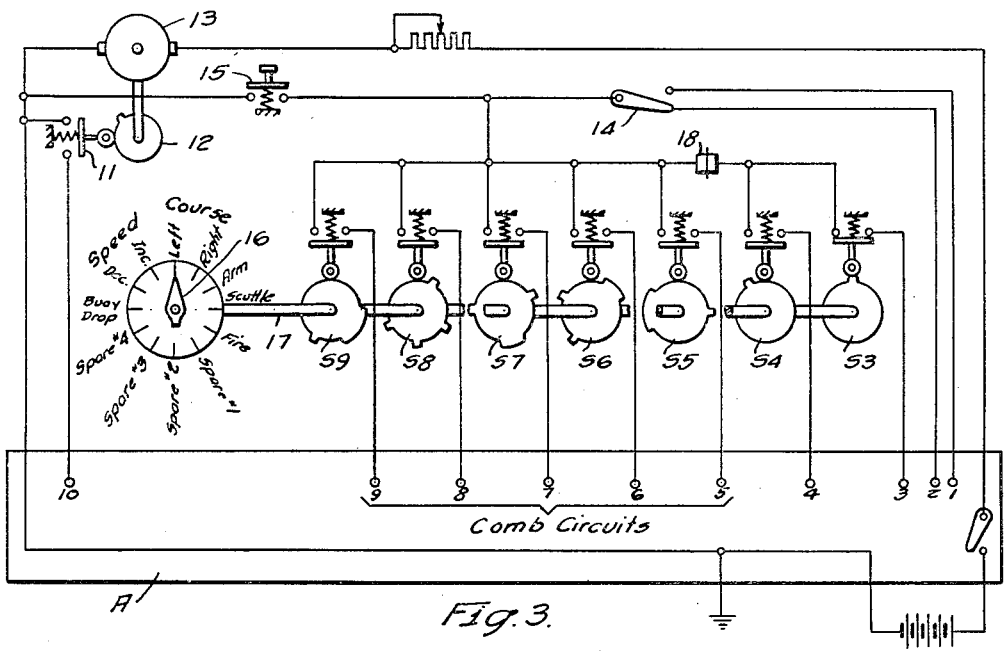

Fig. 3.

| Function | Transmitter | | | Radio Channel Used | Receiver | |
|---|---|---|---|---|---|---|
| | Selector Switches | Record Devices | Relays | | Receiver Relays | Control Relays |
| Drone #1 | 14 | | | 1 | R1 | 41 |
| Drone #2 | 14 | | | 2 | R2 | 41 |
| Left Course | S3 | 33 | CR-CR3 | 3 | R3 | |
| Right Course | S4 | 35 | CR-CR4 | 4 | R4 | |
| Dec. Speed | S-S6-S7 | 40 | CR | 6-7 | R6-R7 | CR6 - CR7 |
| Inc. Speed | S¹-S6-S8 | 39 | CR | 6-8 | R6-R8 | CR6 - CR8 |
| Arm | S5-S6 | 28 | CR | 5-6 | R5-R6 | CR6 |
| Scuttle | S5-S7 | 27 | CR | 5-7 | R5-R7 | CR7 |
| Fire | S5-S8 | 26 | CR | 5-8 | R5-R8 | CR8 |
| Spare #1 | S6-S9 | 25 | CR | 6-9 | R6-R9 | CR6 - CR9 |
| Spare #2 | S7-S8 | 24 | CR | 7-8 | R7-R8 | CR7 - CR8 |
| Spare #3 | S7-S9 | 23 | CR | 7-9 | R7-R9 | CR7 - CR9 |
| Spare #4 | S8-S9 | 22 | CR | 8-9 | R8-R9 | CR8 - CR9 |
| Buoy Drop | S5-S9 | 21 | CR | 5-9 | R5-R9 | CR9 |
| Periodic Sig. | 3 Min. Timer | | | 10 | R-10 | CR5-10 Min. Timer |

Fig. 4.

INVENTORS
Walter Schaelchlin, Amos J. Winchester, Jr.
and John C. Ponstingl.
BY Paul E. Friedemann
ATTORNEY INVENTORS
Walter Schaelchlin, Amos J. Winchester, Jr.
and John C. Ponstingl.
BY
Paul E. Friedemann
ATTORNEY May 8, 1951　　　W. SCHAELCHLIN ET AL　　　2,551,972
REMOTE-CONTROL SYSTEM
Filed Nov. 21, 1946　　　　　　　　　　7 Sheets-Sheet 6

INVENTORS
Walter Schaelchlin, Amos J. Winchester, Jr.
and John C. Ponstingl.
BY
Paul C. Friedemann
ATTORNEY

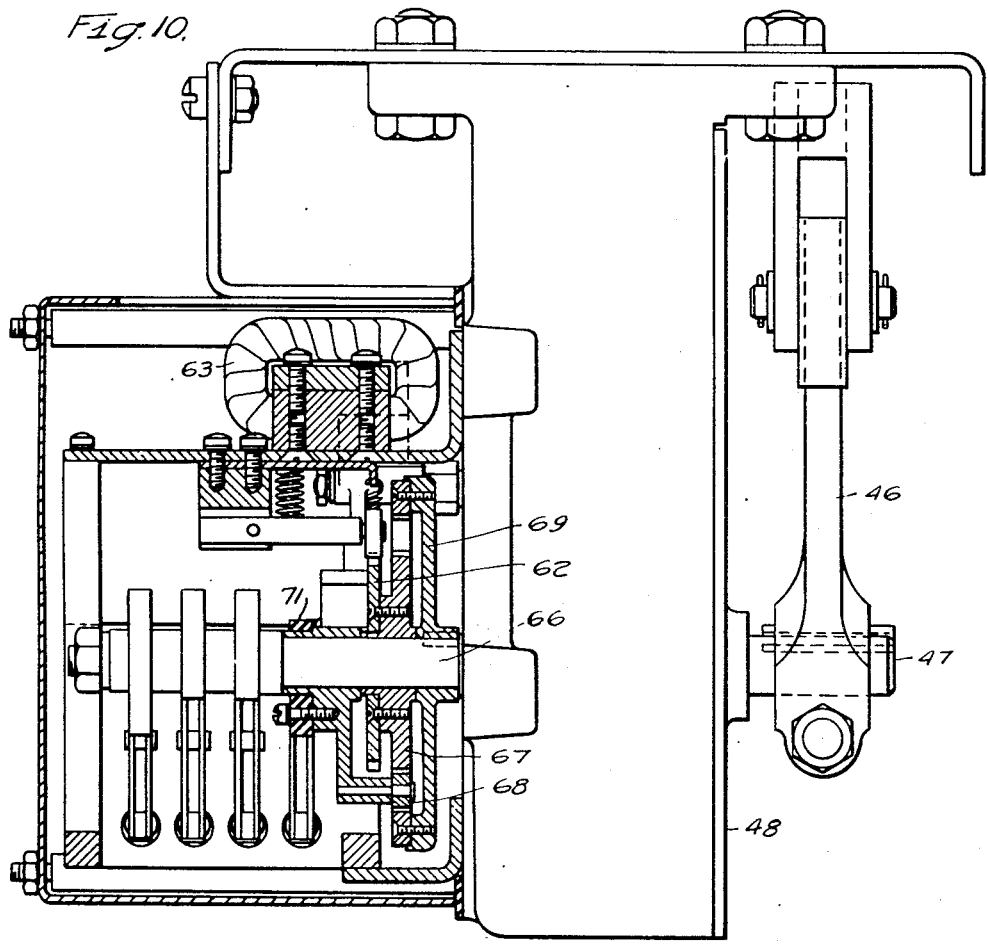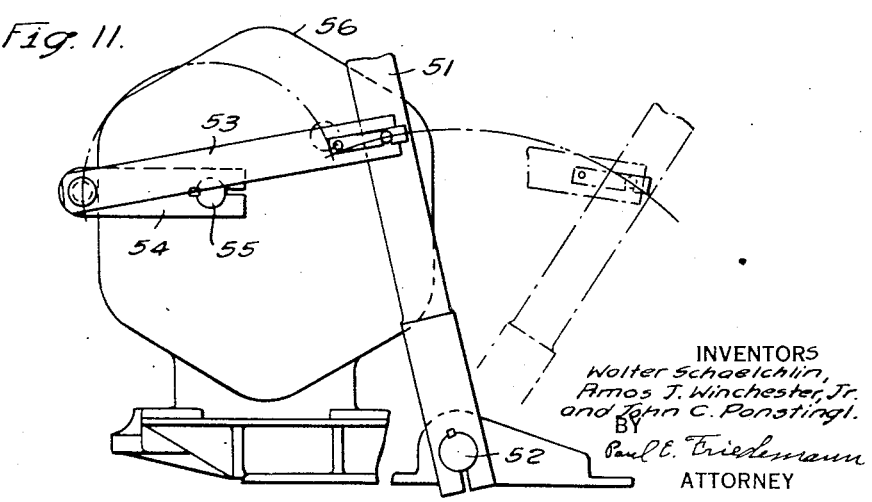

Patented May 8, 1951

2,551,972

UNITED STATES PATENT OFFICE 2,551,972

REMOTE-CONTROL SYSTEM

Walter Schaelchlin, Amos J. Winchester, Jr., and John C. Ponstingl, Pittsburgh, Pa., assignors, by mesne assignments, to the United States of America as represented by the Secretary of the Navy Application November 21, 1946, Serial No. 711,428

15 Claims. (Cl. 318—16)

1

This invention relates to a remote control system and, more particularly, to a system for controlling the operation of a ship or the like from a remote point.

In the operation of ships, particularly in the case where it is desired to load the ship with explosives and use the ship in a demolition operation, it is desirable to control all operations of the ship from a remote point. This problem is rendered difficult by reason of the numerous operations to be controlled in order that the ship may be directed to the desired point for the explosion. It is necessary to provide means for controlling the clutching and throttling of the power mechanism for propelling the ship and also to control the steering mechanism of the ship. In addition to such prime operations, it is necessary to provide means for controlling other operations, such as the arming and firing of the explosive which is carried by the ship being used in the demolition operation.

Accordingly, one of the principal objects of this invention is to provide apparatus by which the operation of a ship may be effectively controlled from a remote point. To this end, this invention contemplates the provision of radio transmitting apparatus adapted to be located at a point remote from the ship being controlled, and radio receiving apparatus adapted to be located on the ship being controlled, together with a novel form of control mechanism for controlling the operation of both the transmitting and receiving apparatus, whereby the numerous operations incidental to remotely controlling the ship may be affected. The radio apparatus employed is preferably of the pulse type having a plurality of channels respectively adapted to deal with pulses of radio energy of different frequencies. The control mechanism is arranged so that two or more channels may be operated at one time, no combination of channels being the same, in order that a number of operations, greater than the number of radio channels provided, may be controlled.

The above and other objects of this invention will become apparent during the course of the following description.

Figure 1:
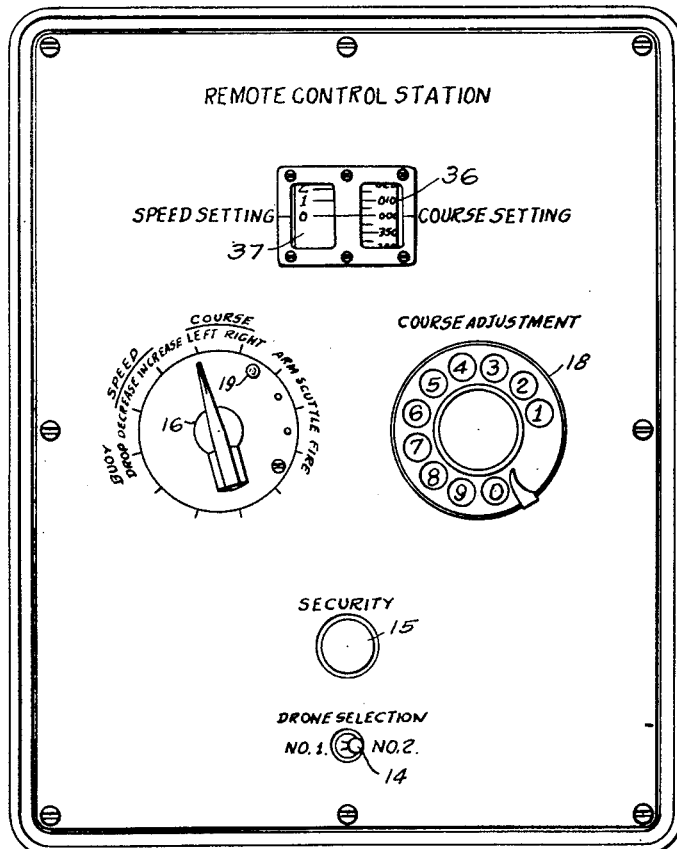

In the drawings there is shown a preferred embodiment of the invention. In this showing:

Figure 1 is a plan view of a control station from which the various operations necessary for controlling the operation of one or more ships may be initiated, Fig. 2 is a plan view of a transfer station, which is employed when two control stations such as

Figure 5:
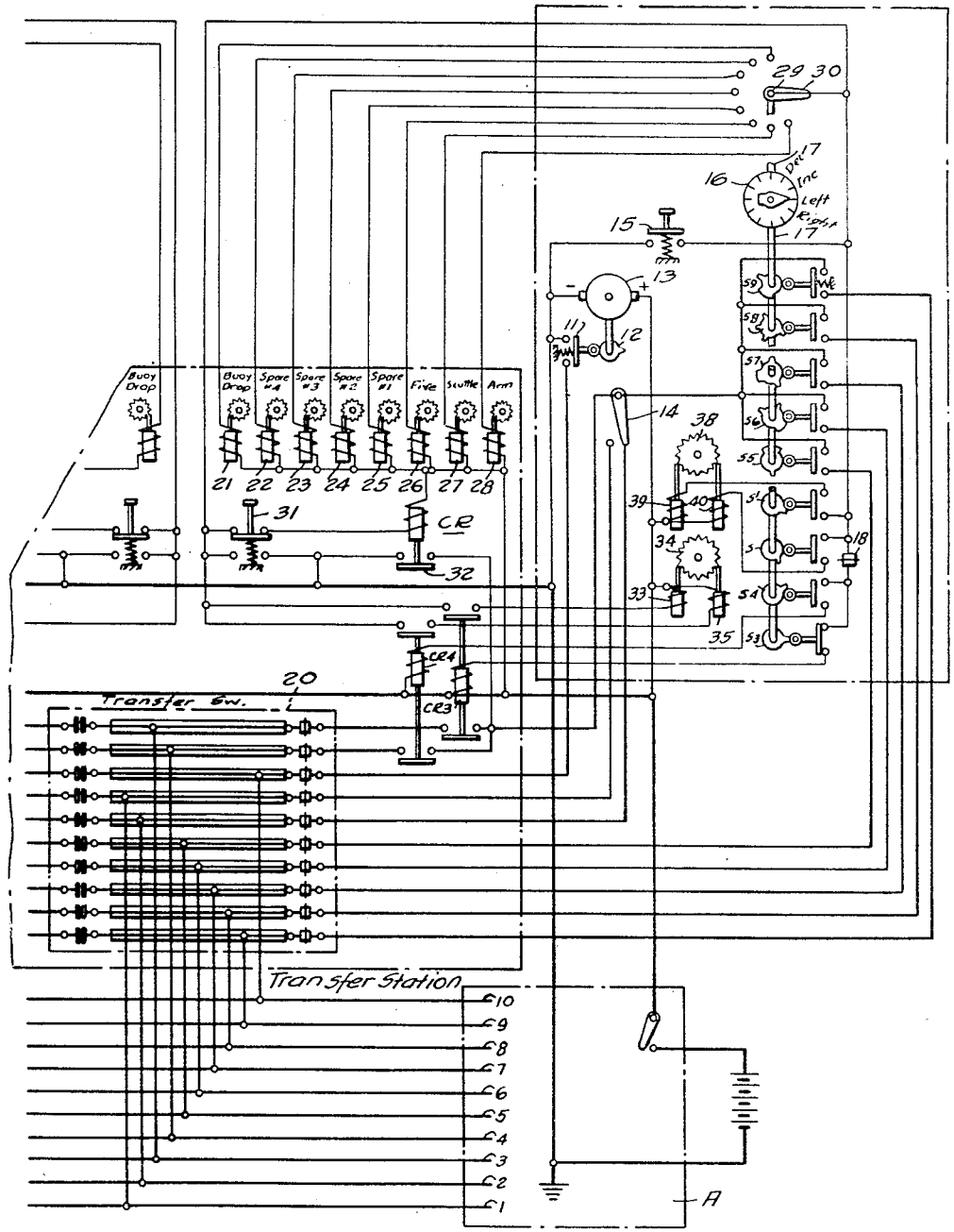
Figure 6:
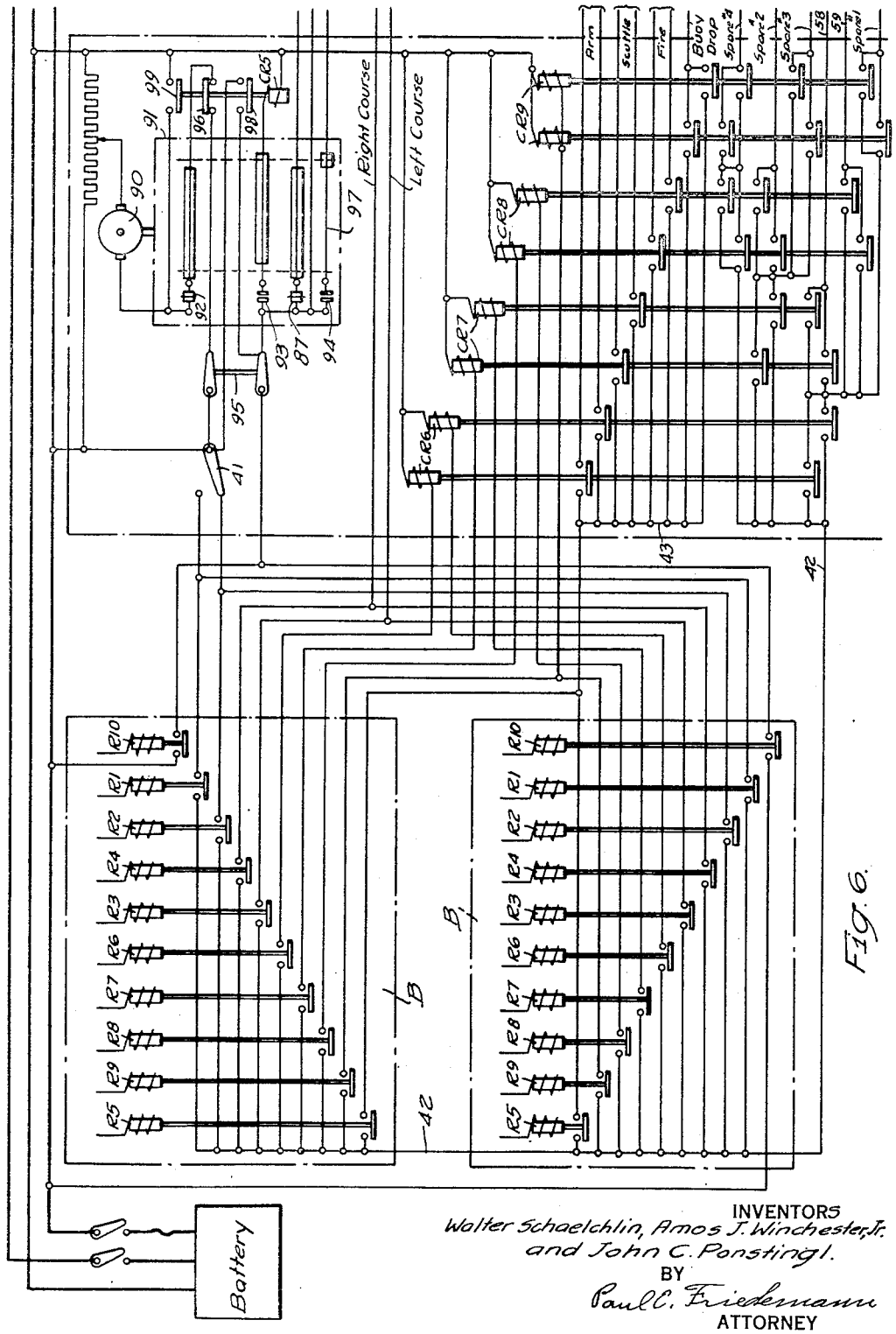
Figure 7:
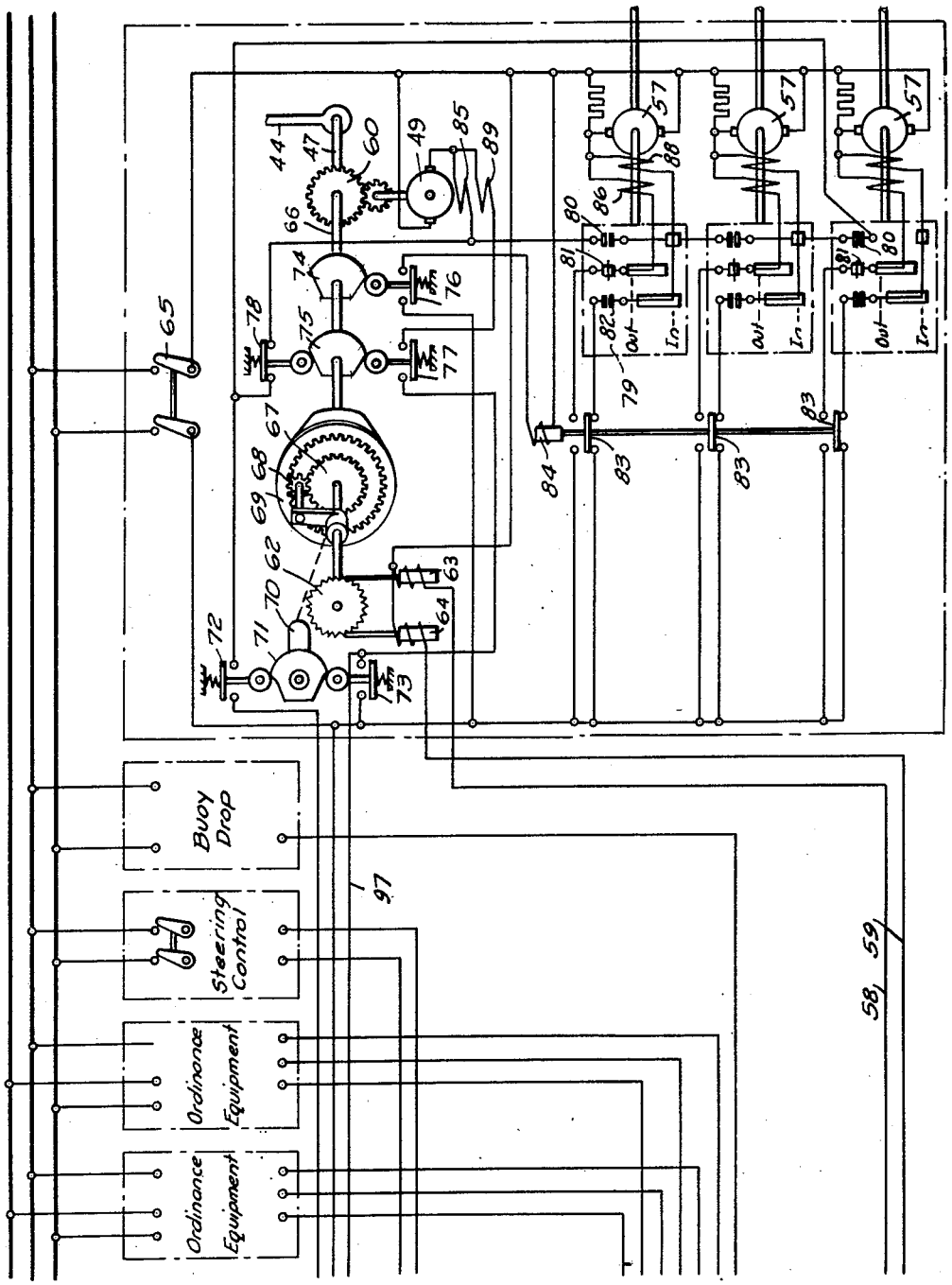
Figure 8:
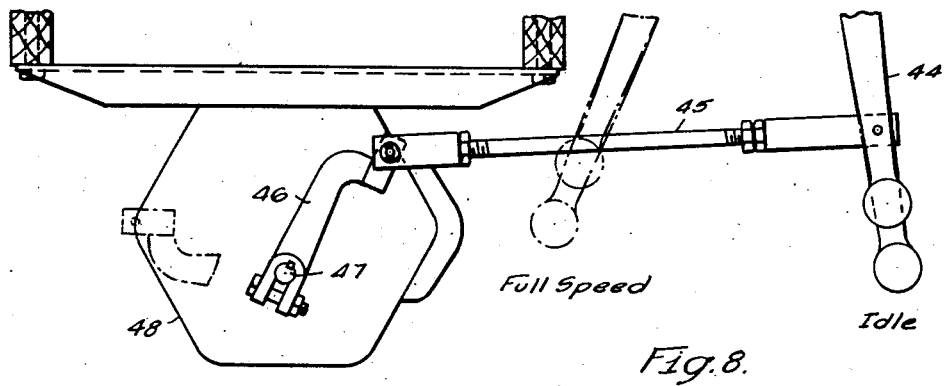
Figure 9:
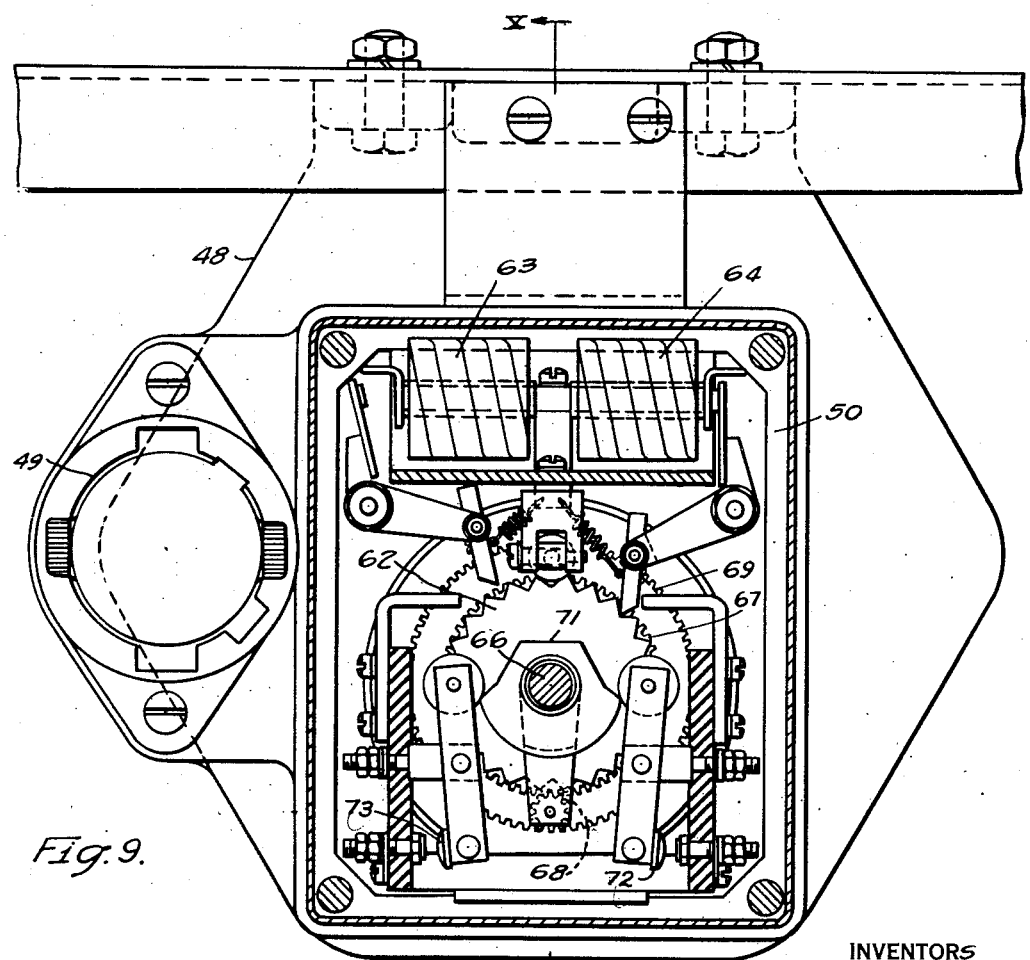

2 illustrated in Fig. 1 are used, and for indicating the various operations on board ship which have been performed, Fig. 3 is a schematic diagram illustrating a simplified form of transmitter control, particularly adapted for use where the remote control is air-borne, Fig. 4 is a chart designating the elements shown in Fig. 3 and subsequent figures which are employed for effecting certain operations;

Fig. 5 is a partial view similar to Fig. 3 of a preferred form of transmitter control for use with control and transfer stations as illustrated in Figs. 1 and 2, Fig. 6 is a schematic view diagrammatically illustrating the radio receiving apparatus and relays operated thereby, which are mounted on board the ship being controlled, Fig. 7 is a schematic view of the apparatus controlled by the system illustrated in Fig. 6 which together with Fig. 6 schematically illustrates the ship-borne control mechanism, Fig. 8 is an elevational view of a throttle control lever and operating mechanism therefor, Fig. 9 is an enlarged view from the opposite end of the throttle operating mechanism shown in Fig. 8, a part thereof being removed to illustrate some of the control mechanism diagrammatically shown in Fig. 7, Fig. 10 is a partial sectional view taken along the line X—X of Fig. 9, and Fig. 11 is an elevational view of a clutch operating lever and operating mechanism therefor.

Referring to the Figs. 3 and 5 of the drawings, the letter A designates a radio transmitter which is employed for remotely controlling the desired operations. The transmitter A is provided with ten operating channels, numbered 1 through 10, which are respectively adapted to send out pulses of radio energy on different frequencies. In Fig. 6, the letter B designates radio receiving apparatus which is provided with ten tuned receiving channels respectively tuned to the frequency of the transmitting channels of the transmitter A. The construction and operation of the transmitters A and receives B form no part, per se, of this invention, any transmitter and receiver known in the art and having ten separate channels being employable for the purpose of this invention. The showings of Figs. 3 and 5 illustrate the manner in which the transmitting apparatus is controlled. For an understanding of the operation of the transmitter, it will be sufficient to point out that at any time one of the leads to the various channels is connected to ground, such channel will operate to transmit radio energy at its predetermined frequency. Since more than ten control operations must be provided, it is necessary that certain of the channels be caused to operate simultaneously in combination. The manner in which the ten channels are opearted to perform a greater number of operations will become apparent during the course of the following description.

Three of the channels (1, 2 and 10) are employed and set aside as control channels. Referring to Fig. 3, it will be seen that channel 10 is connected to ground by means of a switch 11 under the control of a cam 12 operated by a timer motor 13. The timer motor 13 through a suitable drive (not shown) is adapted to rotate the cam 12, one revolution every three minutes. Accordingly, every three minutes, the cam 12 will operate to close the switch 11 and thus cause channel 10 to emit a pulse of radio energy. Upon failure of the channel 10 to send out a periodic timing pulse, or of the receiver channel 10 to receive such a pulse, the apparatus will operate to move the ship's throttle to its idling position and de-clutch the ship's driving motors in a manner to be described.

Channels 1 and 2 are employed as drone selector channels for the purpose of enabling the control apparatus to operate a selected one of two ships. The channels 1 and 2 are connected to ground and caused to transmit radio energy on their respective frequencies through a drone selector switch 14 and a security switch 15. In a manner which will become apparent, any operation performed on board ship must be accomplished through operation of either the channel 1 and 2 and at least one of the channels 3 through 9. The drone or ship being controlled is set up initially with one of its receiver channels 1 or 2 selectively rendered receptive in a manner to be described. Thus, one of the transmitter channels 1 or 2 must be selected in accordance with the selection made of the receiver channels 1 or 2 on board the drone or ship being controlled. By the use of the drone selector channels 1 and 2 in combination with the remaining channels 3 through 9, it is possible for one control station to operate two different ships, and the possibility of the control apparatus being jammed by enemy transmitters is rendered difficult.

A manually operable dial 16 is provided for setting up the control apparatus in accordance with the operation to be performed aboard ship. Rotation of the dial 16 to the various operations indicated rotates a shaft 17 which varies the position of cams and switches operated thereby, designated S3 through S9, which respectively control the transmitting operation of channels 3 through 9. In the showing of Fig. 3, the dial 16 designates left course and in this position the cam S3 has operated to close its associated switch so that transmitter channel 3 will be connected to ground upon closure of the security switch 15. Upon movement of the dial, one step to right course, S4 will close to similarly connect channel 4 to ground. For channels 3 or 4 to operate to vary the course of the ship to left or right, the ship drone selector channel 1 or 2 must be operated at the same time as will become apparent later. Channels 3 and 4 are the only channels which are operated singly in combination with either of channels 1 or 2. The remainder of the channels 5 through 9 under the control of cam switches S5 through S9 are operated two at one time. For example, in arming the explosive which is on board ship, the channels 5 and 6 are connected to ground through the cam operated switches S5 and S6 upon operation of the security switch 15. The chart in Fig. 4 may be referred to under the column entitled, "Selector Switches," and the column entitled, "Radio Channel Used," to determine which of the channels are employed in the various operations as pointed out above. Accordingly, Fig. 4 may be employed to determine the specific circuits set up for each of the numerous operations listed which are to be performed aboard ship.

The control apparatus shown in Fig. 3 is a simplified form of control where it is desired to effect control from an air-borne station and decreased weight of the apparatus is an essential consideration. When using this form of apparatus, the transfer switch and mechanism for indicating the operation performed shown in Fig. 2 are not used. The operator will merely turn the dial 16 to the operation desired and press the security button 15 to initiate performance of such operation. An ordinary telephone dial switch 18 is provided where the course of the ship is to be changed. For example, if it is desired to change the course of the ship 8° to the left, the dial 16 is placed on left course and the dial 18 is rotated 8 notches with the security button 15 held in its closed position. This will open and close the switch 18 between the connection of channel 3 to the transmitter and ground eight times. There thus will be eight pulses of energy sent out over channel 3 and the steering mechanism will be moved eight steps in the appropriate direction to change the course of the ship.

Referring to Fig. 1, it will be noted that a removable stop 19 is provided for cooperation with the dial 16. The stop 19 is provided for the purpose of preventing accidental movement of the switch 16 into the positions of arming, scuttling, or firing during such time as the ship is being maneuvered into the position where such operations are to be performed.

The schematic showing of Fig. 5 illustrates the preferred form of control apparatus and this arrangement shows how the controls illustrated in Figs. 1 and 2 are tied together. This apparatus embodies the same elements illustrated in Fig. 3 and the description in connection with Fig. 3 applies equally well to the apparatus shown in Fig. 5. The apparatus shown in Fig. 5 differs from that shown in Fig. 3 by reason of the inclusion of the transfer switch 20 and the indicating devices shown in Figs. 1 and 2. The transfer switch 20 is a two-position switch which is adapted to selectively connect the transmitter channels 1 through 10 to either of two control stations of the type illustrated in Fig. 1. By reason of this switch, only one control station may be used to operate the transmitter channels at one time and the plurality of memory devices shown in Fig. 2 will be operated by only one control station. The transfer switch 20 of Fig. 2 thus cooperates with the drone selection switch 14 of Fig. 1 and enables the controlling of either two separate drones or a single drone from two control stations and a single transmitter.

In connection with the showing of Fig. 5, it is to be understood that there is illustrated only a portion of the complete apparatus of the preferred embodiment. Since the preferred embodiment embodies two control stations, it will be apparent that the portion of the apparatus omitted from the showing of Fig. 5 is identical with the control device at the right of such figure. The preferred embodiment also employs two transmitters A and either control station operated will effect simultaneous operation of like channels in the two transmitters. The use of two transmitters provides a safety measure in the event a failure of one of the channels to transmit radio energy. Obviously, only one transmitter need be employed in the event that the precautionary feature provided by two transmitters is not desired.

In order that an indication may be had of the various operations, a plurality of solenoid operated indicating devices, 21 through 28, are provided. A control switch 29 is connected to the dial shaft 17 for rotation therewith. Upon movement of the contact arm 30 of the switch 29 to a position connecting with one of the stationary contacts of the leads from the operating coils of the solenoid operated indicators 21 through 28, a circuit is set-up which is completed upon operation of security switch 15. For example, upon movement of the dial 16 ninety degrees in a counterclockwise direction from the position shown in Fig. 5, the apparatus will be set up for the operation entitled Buoy Drop. In this position, control switches S5 and S9 will be operated and channels 5 and 9 will be rendered operative upon closure of the security switch 15, connecting such channels to ground. At the same time, a circuit will be completed from the positive side of the battery through the coil of the solenoid operated indicator 21 and switch 29 to ground. Thus, there will be an indication had at the control transfer station of Fig. 2 that the operation entitled, Buoy Drop, aboard the ship being controlled has been initiated. In the same manner, the solenoid operated indicators 22 through 28 function to perform their respective indications for the various positions of the dial control switch 16.

In the showing of Fig. 5, it will be noted that the security switch 15 is not operable to connect the channels directly to ground as is the case of the security switch 15 of Fig. 3. This function is performed by a control relay CR which has its upper terminal connected to the positive side of the battery and its lower terminal connected through the reset switch 31 to the security switch 15. Upon closure of the security switch 15 in this case, a circuit to ground will be completed through the relay CR which will pick up and close the contactor 32. Upon energization of the relay CR and closure of the contactor 32, channels 5 through 9 and channels 1 and 2 may be connected to ground.

Another difference in the showing of Fig. 5 is the employment of relay CR3 and CR4 for controlling the connection of channels 3 and 4 to ground. In the position shown, the control S3 is closed and upon closure of the security switch 15, relay CR3 will be energized and its lower contact will close to connect channel 3 to ground. At the same time, the upper contact of relay CR3 will close to complete a circuit to ground through the coil of solenoid 33. When solenoid 33 is energized, it will move a ratchet wheel 34 one notch in a clockwise direction. The ratchet wheel 34 carries an indicating device 36 shown in Fig. 1 which is calibrated in degrees from 0 to 360. Each time the solenoid 33 is operated, the course setting will be changed one degree and this change will be indicated on the dial 36 of the remote control station. The control relay CR4 operates in a like manner to energize the solenoid 35 and operate the ratchet wheel 34 in a counterclockwise direction for changes in right course. For each pulse over channels 3 or 4, the indicating device 36 will be operated 1° according to the direction in which change of course of the ship being controlled.

In order that speed and setting of the control lever may be indicated, the remote control station is provided with a speed setting dial 37 which is operated by a ratchet wheel 38. To actuate the ratchet wheel, solenoids 39 and 40 are provided and cam operated control switches S and S' are mounted on the shaft 17. In the event that the dial 16 is moved to the increase speed position, control switches S', S6, and S8 will be closed as indicated by reference to the chart of Fig. 4. The controls S6 and S8 function to operate channels 6 and 8 upon closure of the security switch 15, as set forth above. When the security switch is closed, a circuit will be completed through the coil of solenoid 40 and ratchet wheel 38 will be moved one notch in a clockwise direction. This change in speed setting will be indicated by the dial 37 carried by the ratchet wheel 38. The solenoid 39 is operated in a similar manner to indicate decreases in the speed setting. The throttle control lever is moved from idling to full open position, step by step, and this movement is preferably accomplished in ten steps. Suitable stops (not shown) may be provided to prevent movement of the ratchet wheel beyond the points indicated by extreme positions of the throttle lever.

As pointed out above, the apparatus aboard ship is controlled through receivers B shown in Fig. 6. Two receivers B are preferably employed as a precautionary measure. The receivers B are provided with ten channels tuned to the frequency of transmitting channels 1 through 10. Each of the receiving channels are provided with a relay which picks up upon the reception of a signal over its channel. These relays are numbered R1 through R10. A selector switch 41 is provided for selecting the channel to which the apparatus will respond. It will be noted that the selector switch 41 has its pivot terminal connected to the C+ lead or battery and its movable terminal selectively connected to either of the leads controlled by the relays R1 or R2. In the position shown in Fig. 6, upon reception of a signal over channel 2, relay R2 will pick up and energize the common lead 42 at the left of the receivers. Energization of lead 42 is necessary before any of relays R3 through R9 will be capable of performing their function. It will be particularly noted that the selector switch 41 must be connected to the same channel as transmitter selector switch 14 in order that relays R3 through R10 may be capable of performing their function.

In the event that a change of direction of the ship being controlled is called for from the remote control station, relays R2 and either R3 or R4, according to the direction of change, will pick up. This will energize the circuit designated, right course or left course, according to the channel 3 or 4 that was operated.

The operations completed are indicated at the right of Fig. 6 and these leads in Fig. 7 are shown connected to the operations controlled. The operations controlled are illustrated diagrammatically with the exception of the clutch and throttle control. With the exception of the clutch and throttle control, the specific apparatus for carrying out the various operations indicated have not been shown in detail. It will be sufficient for the purposes of this invention to point out that the operation is initiated by the energization of the leads at the right of Fig. 6.

Referring to the chart of Fig. 4, it will be noted that a majority of the operations are accomplished by combinations of radio channels 5 through 9. Each combination of two channels employed is effective to initiate only a single operation.

In order that only a single function will be performed by combinations of channels 5 through 9, control relays CR6 through CR9 and associated contacts are employed. When relay R5 picks up, its contact is effective to energize lead 43. Energization of the circuits from lead 43 to the operations designated Arm, Scuttle, Fire and Buoy Drop are additionally controlled by the upper contacts of control relays CR6 through CR9. Control relay CR6 is energized upon operation of relay R6 by a signal received over channel 6. In like manner, control relays CR7 through CR9 are effected upon reception of signals over channels 7 through 9.

For the other combinations, it will be noted that the lower contacts of control relay CR6 control the energization of the circuits through lower contacts of control relays CR7 through CR9 for the operations designated Spare #3, Decrease Speed, Increase Speed, and Spare #1.

In like manner, the middle contacts of control relay CR7 control the energization of circuits through the central contacts on control relay CR8 and CR9. The energization of any of the above circuits may be readily determined by reference to the chart of Fig. 4 and the circuits readily traced through the closed contacts. Numerals are not applied to the various contacts of control relays CR6 through CR9 in the interest of simplicity.

Reference to the chart of Fig. 4 in connection with the showing of Fig. 6 will facilitate tracing the control circuits to the various operations designated at the right of Fig. 6. By referring to the column entitled, Receiver Relays, the circuits may be traced from left to right beginning with the common lead 42. The receiver relays R6 through R9 control the energization of the control relays CR6 through CR9. Knowing which of the relays have been operated enables the tracing of the circuit through the contacts of the control relays. The control relays CR6 through CR9 are double relays with their contacts arranged in parallel so that if one of such relays fails to operate, a circuit may still be completed to the operation desired. The same safety feature is had by the use of two receivers B and associated relays R1 through R10. Operation of a channel in only one receiver and its associated receiver relay is necessary to effect a given operation. It will be apparent that only a single receiver with a single set of receiver relays and control relays may be employed if desired.

Figs. 7 through 11 are concerned mainly with the mechanism by which the operation of the ship's propulsion mechanism is controlled. Referring to Fig. 8, the numeral 44 indicates a throttle lever for controlling operation of the prime mover for the ship's propeller shaft which is connected by a link 45 to a rotatable operating member 46 mounted on a shaft 47. The shaft 47 is power-driven through speed reduction gearing (not shown) mounted in the housing 48. The speed reduction gearing referred to is driven by an electric motor 49 mounted on the housing 48. The numeral 50 designates as a whole the apparatus by which the operation of the motor 49 is controlled. The control apparatus 50 is shown schematically in Fig. 7. The operating members 45 and 46 may actuate either a single throttle 44 or a plurality of such throttles in the event that a plurality of drive motors (not shown) are employed.

In Fig. 11, numeral 51 indicates a clutch lever for operating a clutch shaft 52 which is operatively connected to a clutch (not shown) for connecting or disconnecting the propeller of a ship with respect to the driving motor (not shown) employed for rotating the ship's propeller. The clutch lever 51 is connected by a link 53 to a rotatable operating member 54 mounted on a shaft 55 driven by speed reduction gearing mounted in the housing 56. The speed reduction gearing referred to is driven by electric motors 57 schematically illustrated in Fig. 7. As shown in Fig. 7, three clutch motors 57 are employed and it will be understood that such motors operate simultaneously three clutch levers, such as the lever 51. If desired, a single motor 57 could be employed and in such case, the clutch levers 51 would be mechanically connected together for simultaneous operation by a single clutch motor 57, as is the case with the throttle levers 44.

Referring to Fig. 7, the decrease speed impulse comes in over lead 58 and the increase speed impulse comes in over lead 59. The energization of these leads, as pointed out above, are controlled through the contacts of control relays CR6 and CR7, and CR6 and CR8, as shown in Fig. 6.

The arrangement shown in Fig. 7 is illustrated in the shut-down position with the throttle lever 44 in its idling position while the clutch levers 51 controlled by the motors 57 are in their disengaged position. The throttle lever 44 is driven through speed reduction gearing 60 from motor 49. Control of motor 49 and motors 57 is effected through a follow-up mechanism which is under the control of a ratchet wheel 62 operated by solenoids 63 and 64. The solenoids 63 and 64 are provided with separate operating coils respectively having the lower terminals thereof connected to the leads 58 and 59, and the upper terminals thereof connected to the negative side of the power supply battery through a control switch 65. Upon energization of the lead 59, the solenoid 64 will operate to move the ratchet wheel 62 one step in a counterclockwise direction. Similarly, energization of the lead 58 will operate the solenoid 63 to move the ratchet wheel 62 one step in a clockwise direction. A shaft 66a connects the ratchet wheel 62 to a gear 67 which meshes with an idler gear 68 which is also meshed with an internal gear 69. Upon movement of the gears 67 and 69, relative to each other, the idler gear 68 will rotate the shaft 70 and cam 71 carried thereby. The cam 71 controls the closing of contacts 72 and 73. The gear 69 is mounted on the shaft 66 and is connected with shaft 47, through suitable gearing, which operates the throttle lever 44 and which is driven from the throttle drive motor 49. Control cams 74 and 75 are mounted on the shaft 66 for rotation therewith and respectively control contacts 76, and contacts 77 and 78.

The clutch motors 57, in addition to driving the shaft 55 to operate the clutch lever 51 also operate a cam operated contactor 79 which has three cam-controlled contacts 80, 81, and 82 diagrammatically illustrated in the layout of Fig. 7. The circuits through the contacts 81 and 82 are also controlled by the contactors 83 of a control relay 84.

As pointed out above, the apparatus is illustrated in its shutdown position with the throttle lever 44 in its idling position and the clutch levers 51 in the disengaged position. To place the apparatus in operation, the control switch 65 is closed. Upon energization of the lead 59, the solenoid 64 will operate to move the ratchet wheel 62 one step in a clockwise direction. Such action will rotate the idler gear 68 counterclockwise and thereby the cam 71 in a clockwise direction and the contact 72 will close to complete a circuit through the series field 85 of the motor 49. As soon as the motor 49 starts operating, shaft 66 will move in a counterclockwise direction, opening contact 78 and closing contacts 76 and 77. Opening of the contact 78 will interrupt the circuit to the motor 49 and closing of the contact 76 will cause relay 84 to pick up and connect contacts 81 to the positive side of the battery. This will complete a circuit through the series fields 86 and pilot motors 57 and the pilot motors 57 will then be operated to drive the clutch to their in or engaged position. When this position is reached, contact 81 opens and contacts 80 and 82 close. Opening of contacts 81 will interrupt the circuit to the clutch motors and closing of the contacts 80 will once again energize the motor 49 through the contact 72 and the contact 87 of the timing device shown in Fig. 6. The motor 49 will then continue to operate and drive the throttle lever 44 one step toward its full speed position. This movement rotates the gear 69 which effects rotation of the idler gear 68 in a counterclockwise direction and this movement returns the cam 71 to the position shown in Fig. 7, at which point the contact 72 opens to interrupt the circuit through the motor 49. Subsequent operations of the solenoid 64 calling for additional speed increases through the follow-up shaft 70 first effect clockwise movement of the follow-up cam 71 to close the contact 72, and thereafter the gear 69 operates to restore the position of the cam 71, stopping operation of the motor 49 after the speed increase called for has been satisfied. It will thus be seen that the cam 71 is a follow-up cam which operates in a step by step manner to move the throttle through its various positions between idling and full speed.

After the ship has been placed in operation and it is desired to decrease the speed of operation, the lead 58 will be energized to operate the solenoid 63. Such operation will effect counterclockwise movement of the follow-up cam 71 and the contact 73 will close. Closure of the contact 73 will complete a circuit through the closed contacts 77 to series field 89 which is reverse wound with respect to field 85 and reverse the operation of the motor 61. When the speed decrease called for is effected, the follow-up cam 71 will have returned to the position shown in Fig. 7, opening contact 73 and stopping operation of the motor 49.

When sufficient speed decrease pulses have been had to drive the throttle to idling position, it is necessary that the clutch lever 51 be returned to its position disengaging the ship's drive motor from its propeller shaft. The apparatus illustrated in Fig. 7 fulfills this requirement in that when the throttle is returned to its idling position, the cams 74, 75, and 71 are returned to the position illustrated in Fig. 7. It will be recalled that upon movement of the throttle out of idling position, contacts 80 and 82 of cam operated contactor 79 were closed upon movement of the cam shaft to the position indicated as the "in" position. Upon opening of the contact 76 with the return of cam 74 to the position shown in Fig. 7, relay 84 drops out and its contacts complete a circuit through contact 82 to the reverse wound series field 88 of the motor 57. The motor 57 then operates in a reverse direction to drive the clutch lever 51 to its disengaged or out position. Upon reaching the out position, the cam control 79 will be in the position illustrated in Fig. 7 and the contact 82 will have opened, interrupting the circuit to the motor 57, and contact 81 will have closed.

By referring to Fig. 6, an understanding will be had of the manner in which channel 10 operates to effect movement of the clutch and throttle controls to shutdown position upon failure of a periodic timing signal over channel 10. In this showing, numeral 90 designates an electric motor which drives a cam operated relay indicated as a whole by the numeral 91. The cam operated relay 91 has four cams which control the contact 87, previously referred to, and the contacts 92, 93, and 94. The motor 90 is arranged to effect one revolution of the cam relay 91, approximately every ten minutes and in operation will effect movement of the relay back and forth between the normal and shutdown positions indicated by the dotted lines in Fig. 6. Upon movement of the double-pole switch 95 to its closed position, the motor will be energized through contact 96 of the control relay CR5 and contact 92, and the cams of relay 91 will be operated in a clockwise direction to the left, as viewed in Fig. 6, from the normal to the shutdown position.

In the event that no timing signal comes in over channel 10, the cam shaft will move to its shutdown position, closing contact 94 and opening contact 87. Closure of contact 94 will complete a circuit through lead 97, contactor 77 in Fig. 7 to the reverse field 89 and motor 49, and motor 49 will operate to move the throttle 44 to its idling position at which point the clutch will move to its out position, as described above.

In the event that a timing signal comes in over channel 10, prior to closure of contact 94, a shutdown of the apparatus will not be affected. After the cam shaft of relay 91 has moved a slight distance from the position shown in Fig. 6, the contact 93 will have closed, and, thereafter, upon reception of a timing signal over channel 10, a circuit will be had through the switch 95, switch 93 and operating coil of the relay CR5. This will cause relay CR5 to pick up and close contacts 98 and 99. Closure of contact 98 will complete a holding circuit for the relay CR5. Closure of contact 99 will reverse the flow of current through the motor 90 which will then operate to drive the cam shaft 91 toward its normal position. Upon reaching the normal position, contact 93 will open and relay CR5 will drop out to close contactor 96 and the motor will then be once again operative in a direction to drive the cam operated relay 91 toward its shutdown position. Since a timing signal comes in every three minutes and the cam shaft of relay 91 is arranged to complete a revolution approximately once every ten minutes, it is apparent that the cam shaft of relay 91 will be continuously operated back and forth between the normal line and a point to the left of the shutdown line.

In the event that no timing signal is received and the cam shaft of relay 91 has operated to shut down the clutch and throttle controls, as explained above, it will be noted that the contact 87 will have opened. Opening of the contact 87 will interrupt the circuit through the follow-up contact 72 and prevent subsequent operation of the ship in the absence of a periodic timing signal.

The operation of the control apparatus of this invention will be apparent from the foregoing, it being sufficient to point out that the desired operation can be effected by turning the dial switch 16 to the position indicated for such operation and then operating the security switch 15. By referring to the chart of Fig. 4, the controls operated in the transmitter and receiver and the radio channels employed for effecting the operation can be readily ascertained.

Since this invention is not concerned with the specific form of apparatus employed in connection with the steering control, buoy drop, or the arming and firing of the port and starboard ordnances, such apparatus has not been illustrated and has been shown diagrammatically in Fig. 7. In connection with such apparatus, it will be sufficient to point out that upon energization of the leads to such apparatus, relays will be operated which will initiate the desired operation in connection with such apparatus.

Since certain changes may be made in the above construction and different embodiments of the invention may be made without departing from the scope thereof, it is intended that all the matter contained in the above description or shown in the accompanying drawings, shall be interpreted as illustrative and not in a limiting sense.

We claim as our invention:

1. In a radio control system, a transmitter having a plurality of transmitting channels, a receiver having a like number of receiving channels responsive to signals from like channels in the transmitter, at least two of said channels in each of the transmitter and the receiver being selector control channels and one in each a timing signal channel, a plurality of control devices associated with said receiver adapted to be rendered operable upon reception of a signal simultaneously over a selected one of said selector channels and at least one of the remainder of said channels and timing means on said receiver responsive to the timing signal of said transmitter for rendering said control devices inoperative upon failure of said receiver to receive said timing signal.

2. In a radio control system, a transmitter having a plurality of transmitting channels, a receiver having a like number of receiving channels responsive to signals from like channels in the transmitter, at least two of said channels in each of the transmitter and receiver being selector control channels and one in each a timing signal channel, a plurality of control devices associated with said receiver adapted to be rendered operable upon reception of a signal simultaneously over a selected one of said selector channels and at least one of the remainder of said channels, timing means on said receiver responsive to the timing signal of said transmitter for rendering said control devices inoperative upon failure of said receiver to receive said timing signal, a switch on said transmitter movable to either of two positions for rendering a selected one of said selector channels operative to transmit a signal, and a switch on said receiver similarly movable to either of two positions corresponding to the channel selected by said first-named switch.

3. In a remote control system for robot operation of a mechanism having a plurality of operations to be performed, a remotely located transmitter station having a plurality of channels for transmitting signals including a timing signal transmitting channel for transmitting a periodic timing pulse, said channels being lesser in number than the operations to be performed, means for operating said transmitter to cause signals to be sent out simultaneously over different combinations of channels, said different combinations being at least equal in number to the number of operations to be performed, a receiving station having a plurality of relays respectively in receiving channels and rendered operative upon reception of a signal over its corresponding channel, separate circuits for each of said operations to be performed respectively effective upon energization thereof to institute performance of an operation, control relays for said circuits operated by the receiving relays in such manner that the circuit corresponds to the particular combination of channels rendered operative simultaneously to transmit signals, and timing means controlled by the receiving relay responsive to the periodic timing pulse for rendering at least one of said separate circuits inoperative upon failure of said timing signal for a predetermined time interval.

4. In a radio control system for the operation of a ship or the like having a throttle control movable between open and shutdown positions and a clutch control movable from disengaged position to engaged position, a remote control comprising a radio transmitter, and means for operating said transmitter to transmit pulses of radio energy, a radio receiver, and means responsive to the pulses received by said receiver for moving said throttle in a step-by-step manner, said last-named means including means for moving said clutch control to its fully engaged position prior to movement of said throttle control out of its shutdown position and for moving said clutch control to its disengaged position upon movement of said throttle control to its shutdown position, timing means on said transmitter for causing said transmitter to periodically transmit a pulse of radio energy and means on said receiver responsive to said periodic pulses of radio energy for actuating said throttle control to its shutdown position upon failure of said receiver to receive said periodic pulses.

5. In a radio control system for the robot operation of a ship or the like having a throttle movable between open and shutdown positions, a remote control comprising a radio transmitter, and means for operating said transmitter to transmit radio energy, a timing device for causing said transmitter to periodically transmit a pulse of radio energy, a radio receiver, and means responsive to the energy received by said receiver as a result of operation of said first-named means for moving said throttle and, upon failure to receive said periodic timing pulse, for moving said throttle to its shutdown position.

6. In a radio control system for the operation of a ship or the like having a throttle control movable between open and shutdown positions and a clutch control movable to and from engaged and disengaged positions between the engine and propeller shaft of said ship, a remote control comprising a radio transmitter and means for operating the transmitter to transmit radio energy, a radio receiver, means responsive to energy received by said receiver for moving said throttle and including means effective upon movement of said throttle out of shutdown position for moving said clutch control to its engaged position and upon movement of said throttle to its shutdown position for moving said clutch to its disengaged position, and means operative upon failure of said receiver to receive a periodic timing pulse to effect movement of said throttle control to its shutdown position and said clutch control to its disengaged position.

7. In a control system for the robot operation of a ship or the like having a clutch control lever and a throttle control lever, a reversible electric motor for driving said throttle lever between open and idling positions, a reversible electric motor for driving said clutch lever between its engaged and disengaged positions, and circuit means interconnecting said motors effective to operate said clutch motor to drive said clutch lever to engaged position prior to movement of said throttle motor to move said throttle lever out of its idling position, and effective to operate said clutch motor to drive said clutch lever to disengaged position upon operation of said throttle motor to move said throttle lever from an open position to its idling position, control means for said motors comprising a radio transmitter, a radio receiver, means operative in response to radio energy received by said receiver for energizing said interlocking circuit and said throttle motor, and timing control means on said receiver responsive to a timing pulse from said transmitter for operating said throttle motor to move said throttle to idling position upon failure of said receiver to receive said timing pulse.

8. In a system for controlling the operation of a ship or the like having a plurality of operations to be performed thereon, a plurality of circuits respectively operable to institute performance of one of said operations upon energization thereof, and means for remotely controlling the energization of said circuits comprising a transmitter remotely located from said ship and having a plurality of transmitting channels including a timing pulse transmitting channel, a receiver located on said ship and having a like number of receiving channels including a timing pulse receiving channel, each of said receiving channels being rendered operable respectively by operation of a corresponding one of said transmitting channels, a plurality of relays controlling the energization of said circuits, said relays being operable in response to operation of selected combinations of said receiving channels for energizing a selected circuit to perform a selected operation, timing means responsive to the relay associated with said timing pulse receiving channel for controlling at least one of said circuits and being operable to render said one circuit inoperative upon failure of said timing pulse, and a single control device on said transmitter movable to different positions for rendering selected combinations of said channels operative.

9. In a system for controlling the operation of a ship or the like having a plurality of operations to be performed thereon, a plurality of circuits respectively operable to institute performance of one of said operations upon energization thereof, and means for remotely controlling the energization of said circuits comprising a transmitter remotely located from said ship and having a plurality of transmitting channels including a timing pulse transmitting channel, a receiver located on said ship and having a like number of receiving channels including a timing pulse receiving channel, each of said receiving channels being rendered operable respectively by operation of one of said transmitting channels, at least two of said channels being master selector channels, the remainder of said channels being lesser in number than the circuits to be energized, a plurality of relays controlling the energization of said circuits, said relays being rendered operable to energize a selected circuit in response to operation of selected combinations of channels, and a single control device on said transmitter movable to a number of different positions corresponding to the number of operations to be performed, said control device in its different positions being effective to render operable different channels and combinations of channels corresponding to the circuit to be energized, and means responsive to the timing pulse received by said receiver for controlling at least one of said circuits to render said one circuit inoperative upon failure of said timing pulse.

10. In a control system, a receiving station at which a plurality of operations are to be performed, a plurality of circuits respectively operable upon energization thereof to institute performance of one of said operations, a receiver having a predetermined number of receiving channels, each of said channels having a relay arranged to operate when a signal is received over its associated channel, said relays having control contacts controlling the energization of said circuits, said control contacts being arranged in such manner that one of said circuits will be energized in response to simultaneous operation of a predetermined combination of at least two of said relays, each combination of relays effective to energize one of said circuits being different from those combinations effective to energize the others of said circuits, and remotely located means for operating said relays comprising a transmitting station having a predetermined number of transmitting channels respectively operable to transmit a signal to one of said receiving channels, and means for operating said transmitter to cause it to transmit signals simultaneously over predetermined combinations of said channels corresponding to the operation selected for performance at said receiving station and for transmitting a periodic timing pulse, and means on said receiving station responsive to said timing pulse and operative upon failure of said timing pulse for a predetermined time interval for preventing energization of at least one of said circuits.

11. In a control system, a receiving station at which a plurality of operations are to be performed, a plurality of circuits respectively operable upon energization thereof to institute performance of one of said operations, a receiver having a predetermined number of receiving channels including a timing signal receiving channel, each of said channels having a relay arranged to operate when a signal is received over its associated channel, said relays having control contacts controlling the energization of said circuits, said control contacts being arranged in such manner that one of said circuits will be energized in response to simultaneous operation of a predetermined combination of at least two of said relays, each combination of relays effective to energize one of said circuits being different from those combinations effective to energize the others of said circuits, remotely located means for operating said relays comprising a transmitting station having a predetermined number of transmitting channels including a timing signal transmitting channel respectively operable to transmit a signal to one of said receiving channels, a single control device movable to different positions corresponding to the operations to be performed at said receiving station, said control device having parts operable in its different positions to select a combination of said transmitting channels for operation corresponding to the combination necessary to institute performance of an operation at said receiving station, means for causing each transmitting channel of the combination selected by said control device to transmit signals simultaneously, and timing control means in one of said circuits and responsive to the relay associated with said timing signal receiving channel for rendering said one circuit inoperative upon failure of said timing signal for a predetermined time interval.

12. In a control system, a receiving station at which a plurality of operations are to be performed, a plurality of circuits respectively operable upon energization thereof to institute performance of one of said operations, a receiver having a predetermined number of receiving channels including a timing signal receiving channel, each of said channels having a relay arranged to operate when a signal is received over its associated channel, said relays having control contacts controlling the energization of said circuits, said control contacts being arranged in such manner that one of said circuits will be energized in response to simultaneous operation of a predetermined combination of at least two of said relays, each combination of relays effective to energize one of said circuits being different from those combinations effective to energize the others of said circuits, and remotely located means for operating said relays comprising a transmitting station having a predetermined number of transmitting channels including a timing signal transmitting channel respectively operable to transmit a signal to one of said receiving channels, each of said transmitting channels having a control switch for rendering it operative to transmit a signal, a single control device movable to different positions in which it is effective to operate different combinations of said control switches corresponding to the operation to be performed at said receiving device, a master control switch for causing the combination of transmitting channels selected by said control device through said control switches to transmit signals simultaneously, and timing control means in one of said circuits and responsive to the relay associated with said timing signal receiving channel for rendering said one circuit inoperative upon failure of said timing signal for a predetermined time interval.

13. In a radio control system, a transmitter having a plurality of transmitting channels including a timing signal transmitting channel, a receiver having a like number of receiving channels including a timing signal receiving channel responsive to signals from like channels in the transmitter, a plurality of control devices associated with said receiver adapted to be rendered operable respectively upon reception of a signal simultaneously over a combination of at least two of said channels, each of said control devices being responsive to signals from a predetermined combination of said channels so that a different combination of channels is employed for operating said control devices, and timing control means connected with one of said control devices and responsive to the timing signal received by said timing signal receiving channel for rendering said one control device inoperative upon failure of said timing signal.

14. In a system for remotely controlling the operation of a device, the combination of, a transmitter having a constant signal channel, a timing signal channel and a control signal channel; a receiver having a constant signal receiving channel, a timing signal receiving channel, and a control signal receiving channel, electroresponsive operating means for said device, circuit means responsive to both said constant signal receiving channel and said control signal receiving channel for operating said electroresponsive operating means, a timing device operative to prevent operation of said electroresponsive operating means, said timing device having a time cycle greater than the time cycle of said timing signal channel of said transmitter, and means responsive to said timing signal receiving channel for controlling said timing device to prevent said timing device from preventing operation of said electroresponsive operating means.

15. In a radio control system for the remote operation of a pair of movable devices each having a normal position and an operative position, the combination of, a remote control comprising a radio transmitter and means for operating the transmitter to transmit radio energy, a radio receiver, means responsive to energy received by said receiver for moving one of said movable devices from its normal position and including means effective upon movement of said one movable device from said normal position for moving said second movable device to its operative position and upon movement of said one movable device to its normal position for moving said other movable device to its normal position, and means operative upon failure of said receiver to receive a periodic timing pulse to effect movement of said one movable member to its normal position and said other movable member to its normal position.

WALTER SCHAELCHLIN.
A. JACKSON WINCHESTER, JR.
JOHN C. PONSTINGL.

REFERENCES CITED

The following references are of record in the file of this patent:

UNITED STATES PATENTS

| Number | Name | Date |
| --- | --- | --- |
| 1,924,857 | Hodgman | Aug. 29, 1933 |
| 2,025,054 | Hodgman | Dec. 24, 1934 |
| 2,051,974 | Warner | Aug. 25, 1936 |
| 2,141,551 | Phinney et al. | Dec. 27, 1938 |
| 2,206,771 | Dugas | July 2, 1940 |
| 2,325,829 | Boswau | Aug. 3, 1943 |
| 2,330,388 | Scott-Paine | Sept. 28, 1943 |
| 2,395,132 | MacKenzie | Feb. 19, 1946 |
| 2,395,693 | Sorenson | Feb. 26, 1946 |
| 2,396,231 | Brill | Mar. 12, 1946 |
| 2,397,088 | Clay | Mar. 26, 1946 |
| 2,397,475 | Dinga | Apr. 2, 1946 |
| 2,400,260 | Miller | May 14, 1946 |
| 2,404,401 | Plensler | July 23, 1946 |
| 2,413,621 | Hammond | Dec. 31, 1946 |